W. H. WEDDINGTON.
TREAD FOR AUTO TIRES.
APPLICATION FILED MAR. 26, 1912.
1,051,038.
Patented Jan. 21, 1913.
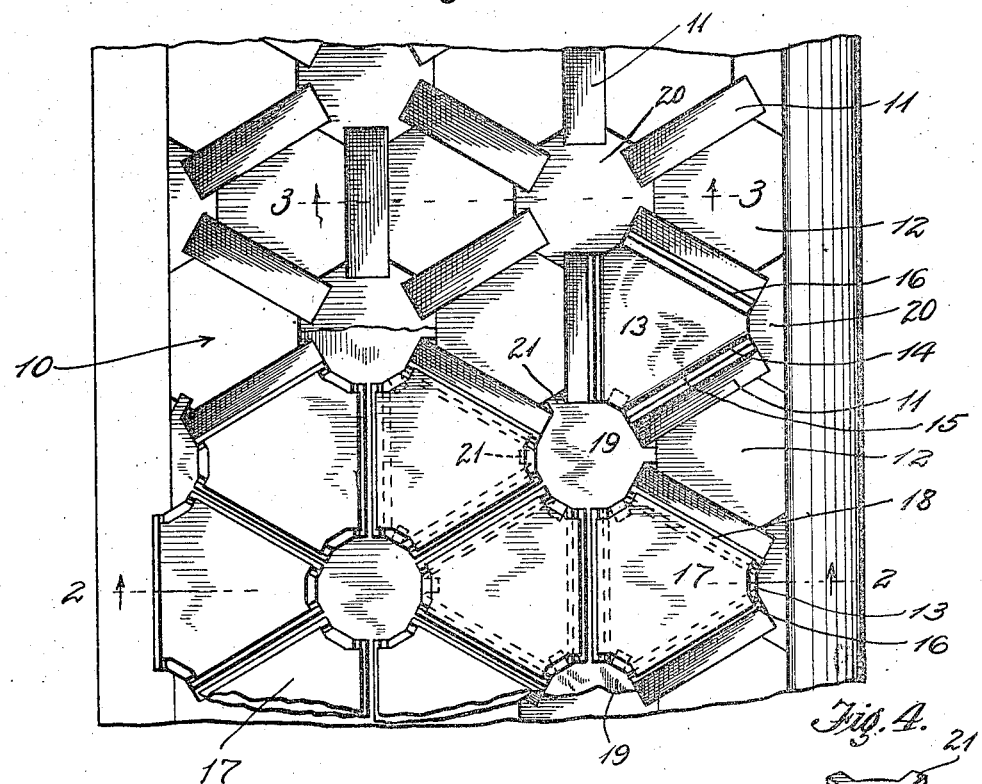
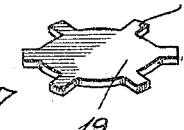
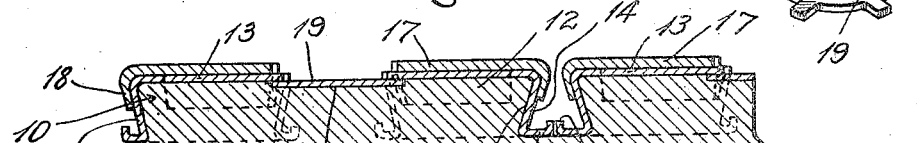
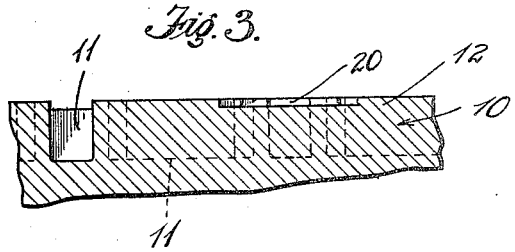
Witnesses:
Inventor.
William H. Weddington

UNITED STATES PATENT OFFICE.

WILLIAM H. WEDDINGTON, OF LANKERSHIM, CALIFORNIA.

TREAD FOR AUTO-TIRES.

1,051,038.  Specification of Letters Patent.  Patented Jan. 21, 1913.

Application filed March 26, 1912. Serial No. 686,301.

*To all whom it may concern:*

Be it known that I, WILLIAM H. WEDDINGTON, a citizen of the United States, residing at Lankershim, in the county of Los Angeles and State of California, have invented new and useful Improvements in Treads for Auto-Tires, of which the following is a specification.

This invention relates to improvements in vehicle tires and has particular relation to the production of tires with protected tread portions for protecting the same against wear and perforation.

It is an object of the invention to provide a tire for vehicles having metallic shoe portions fastened thereto, but movably mounted with respect to each other so as not to destroy the resiliency of the tire.

It is also an object of the invention to provide a tread portion for a resilient tire in which removable shoe plates are secured to the materials of the tire and reinforcing soles or wearing plates applied to said shoes.

It is a further object of the invention to provide a tire having a tread portion of yielding material formed with recesses therein in given relation to each other and to provide metallic shoes, adapted to extend into said recesses for gripping the material of the tire, the shoes also being provided with reinforcing surface portions or soles.

In the accompanying drawing forming a part of this specification, Figure 1 is a plan view of a portion of a tire tread, constructed in accordance with the present invention and having portions thereof supplied with protecting means. Fig. 2 is a transverse sectional view through the tread surface taken upon the line 2—2 of Fig. 1. Fig. 3 is a detail sectional view taken upon the line 3—3 of Fig. 1. Fig. 4 is a detail perspective view of an intermediate protection plate employed upon the tread of the tire. Fig. 5 is a perspective view of one of the shoe plates secured to the tire tread. Fig. 6 is a similar perspective view of one of the sole plates of the tire.

The details and features of the invention will now be more particularly described, reference being had to the said drawing in which—

10 indicates the tread surface of a tire constructed in accordance with the present invention. While the tread surface contemplated by this invention is applicable to various kinds of tires, it is particularly adapted for use upon inflated tires and tires which employ rubber and fabric casings and which ordinarily are subject to rapid wear in use and are liable to be punctured.

As illustrated in the drawing the tire of the present invention is preferably provided upon its tread surface with a series of grooves or recesses 11 formed of considerable depth, the intermediate projections 12 being provided with suitable protecting surfaces or armor. The said armor is preferably formed by providing metallic shoes 13 of a proper contour to fit upon the projections 12. The projections 12 being formed in the rubber or yielding material of the tire are adapted to have the shoes 13 slipped upon the same and to have the side portions 14 thereof bent or crimped inwardly sufficiently to grip the walls of the recesses 11, the rubber yielding so that the bases of the recesses 11 are inclined inwardly and downwardly as clearly shown in Fig. 2. The walls of said recesses 11 are preferably made vertical and parallel before the shoes 13 are applied as shown in Fig. 3.

Although the projections 12 may be of any desired configurations and of various forms within the spirit of the invention, I prefer to make them approximately triangular as disclosed in Fig. 1. In such event the shoes 13 are correspondingly triangular in their body portions and the side gripping parts 14 are bent so as to readily slip upon the said projections. Two of such side walls 14 are generally bent inwardly to the desired angle for gripping the rubber of the projections 12, while the third wall is left bent outwardly to a slight degree as shown in Fig. 5 and after the other two walls have been slipped upon the triangular surface 12, the third wall is crimped inwardly by any suitable tool to firmly secure the said shoe in position upon the projection 12. The wall portions 14 are also provided with flanges 15, which are turned outwardly and rest upon the bottoms of the recess 11 and the extreme edges of said flanges are preferably turned upwardly at 16, so that adjacent shoe flanges 15, will have a bearing upon each other, afforded by said turned up portions 16, to permit of their accommodating the shoes to the yielding action of the tire and yet preventing their edges from catching upon each other so that one may pull the other off.

The walls 14 are made approximately of the same length as the recess 11, so that the shoes 13 practically cover the entire tread surface of the projections 12. The said shoes 13 may be made of any desired metal but are preferably made of a hard kind of copper which will not injure the rubber. Of course it will be understood that steel may be employed if desired.

The tire is further provided with protecting caps or soles 17 preferably made of steel or hard material and of such a shape as to be crimped or fastened upon the shoe 13. The said soles 17 are therefore formed with gripping flanges 18, two of which are preferably bent inwardly before application to the tread of the tire, while the third is crimped after the sole has been placed upon its particular shoe 13. The position of the said soles upon the shoes is clearly indicated in Figs. 1 and 2. The structure of the soles is such that they will receive all of the wear in the use of the tire and when they have become worn so as to be practically useless, they can be pulled off and replaced by crimping new soles in place. In this manner the wear of the tire and its tread portion, will be indefinitely protected and in fact the tire or tire casing will be capable of wear and use as long as the rubber and fabric portion thereof does not crack out at the sides.

To effectively cover and protect the intermediate portions lying between the ends of the tire shoes, an intermediate plate 19 is provided and adapted to fit into slight depressions 20 formed in the material of the tire tread. Said depressions are preferably only the depth of the thickness of said plates 19 as shown in Figs. 2 and 3. To hold the plates 19 in position upon the tire they are provided with projections 21, which are adapted to extend beneath the adjacent ends of the shoe 13. The plates 19 are thus in position to protect the intermediate portions of the tread from puncture but need not be made of great thickness since they do not receive the wear of the tire due to its contact with the pavement or road, the said plates being below the level not only of the soles 17 but of the shoes 13 as clearly shown in Fig. 2. The said plates 19 may be constructed of fiber and will thus be light and not destructive to the rubber in the event of their being slightly loose in their recesses.

In the employment of a tread of this character it will be observed, that while the surface of the tread which is exposed to wear and to the likelihood of puncture may be thoroughly protected, yet because of the disconnected shoes employed, the resiliency of the tire is absolutely unaffected. It will also be observed that the portion of the protecting means which receives the wear, namely the soles 17, may be struck up in quantities and are comparatively inexpensive and may be replaced from time to time so that the shoes and other portions of the tread and the tire are prevented from wearing and are rendered long lived. In the event of a nail or other device being struck by the tire and turned into one of the recesses 11, the flanges 15 will protect the same from being driven into and puncturing the tire.

What I claim is:

1. A resilient tire, comprising a tread, having a series of intersecting grooves formed in the resilient material of the tire, metallic shoes covering the peripheral surfaces segregated by said grooves, and flanges on said shoes projecting into said grooves, adapted to compress and grip the material forming the sides of said grooves, so that the shoes are locked in position thereon.

2. A resilient tire comprising a tread having a series of radiating grooves formed in the material of the tire, segregating projections on said tread, said grooves being formed with vertical walls, and shoes to cover said projections, provided with inturned and inclined flanges projecting into and engaging the vertical walls of said grooves, adapted to compress the inner portions of said walls and form a dovetail to lock the shoes in position on said tread.

3. A tire tread portion comprising a casing having recesses formed in the surface thereof adapted to leave angular projections between the same, shallow recesses arranged between said first mentioned recesses, metallic shoes shaped with bent wall portions adapted to extend into said first mentioned recesses and having outwardly turned edge portions adapted to cover the surface in the bottom of said recesses, removable soles having edge flanges adapted to be crimped upon the said shoes, and intermediate protecting plates mounted in the shallower recesses.

In witness that I claim the foregoing I have hereunto subscribed my name this 13th day of March, 1912.

W. H. WEDDINGTON.

Witnesses:
 EDMUND A. STRAUSE,
 EARLE R. POLLARD.